(12) United States Patent
Chang et al.

(10) Patent No.: US 12,294,447 B2
(45) Date of Patent: *May 6, 2025

(54) SYSTEM AND METHOD FOR HANDLING STACKED CHANNELS

(71) Applicant: Entropic Communications, LLC, New York, NY (US)

(72) Inventors: Glenn Chang, Carlsbad, CA (US); Brian Sprague, Irvine, CA (US); Madhukar Reddy, Carlsbad, CA (US)

(73) Assignee: Entropic Communications, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,201

(22) Filed: Feb. 17, 2022

(65) Prior Publication Data

US 2022/0173822 A1 Jun. 2, 2022

Related U.S. Application Data

(63) Continuation of application No. 17/402,789, filed on Aug. 16, 2021, now abandoned, which is a
(Continued)

(51) Int. Cl.
*H04H 40/90* (2008.01)
*H04H 20/63* (2008.01)
(Continued)

(52) U.S. Cl.
CPC ............ *H04H 40/90* (2013.01); *H04H 20/63* (2013.01); *H04N 7/106* (2013.01); *H04N 7/22* (2013.01);
(Continued)

(58) Field of Classification Search
CPC .. H04N 21/43615; H04N 21/40; H04N 21/41; H04N 21/4108; H04N 21/42684;
(Continued)

(56) References Cited

U.S. PATENT DOCUMENTS 6,341,021 B1 * 1/2002 Wilner ............... H04B 10/2507
398/79
6,631,175 B2 * 10/2003 Harikumar ........ H04L 25/03012
375/232

(Continued)

FOREIGN PATENT DOCUMENTS

CA 2452525 A1 * 6/2004 ....... G11B 20/00086
EP 1867154 B1 * 12/2016 ......... H04N 21/2747

OTHER PUBLICATIONS

"IEEE 100, The Authoritative Dictionary of IEEE Standards Terms, Seventh Edition", Dec. 2000, pp. 725-726. (Year: 2000).*

*Primary Examiner* — James R Sheleheda
(74) *Attorney, Agent, or Firm* — Arch & Lake LLP; Hao Tan; Shen Wang (57) ABSTRACT

A satellite reception assembly may include a housing configured to support receipt and handling of a plurality of satellite signals. The housing may include circuitry incorporating integrated stacking architecture for supporting and/or providing channel and/or band stacking whereby particular channels or bands, from multiple satellite signals that are received via the satellite reception assembly, may be combined onto a single output signal that may be communicated from the satellite reception assembly to a gateway device for concurrent distribution thereby to a plurality of client devices serviced by the gateway device.

22 Claims, 8 Drawing Sheets

Related U.S. Application Data continuation of application No. 16/259,021, filed on Jan. 28, 2019, now Pat. No. 11,121,789, which is a continuation of application No. 14/316,194, filed on Jun. 26, 2014, now Pat. No. 10,193,645, which is a continuation of application No. 13/762,939, filed on Feb. 8, 2013, now Pat. No. 8,799,964.

(60) Provisional application No. 61/620,746, filed on Apr. 5, 2012, provisional application No. 61/596,291, filed on Feb. 8, 2012.

(51) Int. Cl.
| | |
|---|---|
| H04N 7/10 | (2006.01) |
| H04N 7/22 | (2006.01) |
| H04N 21/40 | (2011.01) |
| H04N 21/41 | (2011.01) |
| H04N 21/426 | (2011.01) |
| H04N 21/436 | (2011.01) |
| H04N 21/45 | (2011.01) |
| H04N 21/60 | (2011.01) |
| H04N 21/61 | (2011.01) |
| H04N 21/63 | (2011.01) |
| H04N 21/633 | (2011.01) |
| H04N 21/6332 | (2011.01) |
| H04N 21/637 | (2011.01) |
| H04N 21/6377 | (2011.01) |
| H04N 21/64 | (2011.01) |
| H04N 21/6402 | (2011.01) |
| H04N 21/6405 | (2011.01) |
| H04N 21/6408 | (2011.01) |
| H04N 21/647 | (2011.01) |

(52) U.S. Cl.
CPC .......... *H04N 21/40* (2013.01); *H04N 21/41* (2013.01); *H04N 21/4108* (2013.01); *H04N 21/42684* (2013.01); *H04N 21/43615* (2013.01); *H04N 21/45* (2013.01); *H04N 21/60* (2013.01); *H04N 21/61* (2013.01); *H04N 21/63* (2013.01); *H04N 21/633* (2013.01); *H04N 21/6332* (2013.01); *H04N 21/637* (2013.01); *H04N 21/6377* (2013.01); *H04N 21/64* (2013.01); *H04N 21/6402* (2013.01); *H04N 21/6405* (2013.01); *H04N 21/6408* (2013.01); *H04N 21/647* (2013.01); *H04N 21/64746* (2013.01); *H04N 21/64753* (2013.01); *H04N 21/64761* (2013.01)

(58) Field of Classification Search
CPC ........ H04N 21/45; H04N 21/60; H04N 21/61; H04N 21/63; H04N 21/633; H04N 21/6332; H04N 21/637; H04N 21/6377; H04N 21/64; H04N 21/6402; H04N 21/6405; H04N 21/6408; H04N 21/647; H04N 21/64746; H04N 21/64753; H04N 21/64761

See application file for complete search history.

(56) References Cited

U.S. PATENT DOCUMENTS

| | | | | |
|---|---|---|---|---|
| 7,899,087 | B2* | 3/2011 | McNeely | H04B 7/18526 370/464 |
| 8,111,646 | B1* | 2/2012 | Chang | H04J 14/08 375/232 |
| 8,466,850 | B1* | 6/2013 | Ling | H01Q 1/50 343/878 |
| 8,799,964 | B2 | 8/2014 | Chang et al. | |
| 8,862,761 | B1* | 10/2014 | Nguyen | H04N 21/41407 725/62 |
| 9,712,778 | B2* | 7/2017 | Hieb | H04N 5/50 |
| 10,193,645 | B2 | 1/2019 | Chang et al. | |
| 11,121,789 | B2 | 9/2021 | Chang et al. | |
| 2002/0137510 | A1* | 9/2002 | Sims | H04B 7/18513 455/12.1 |
| 2002/0144289 | A1* | 10/2002 | Taguchi | H04N 7/17318 348/E7.071 |
| 2002/0154055 | A1 | 10/2002 | Davis et al. | |
| 2003/0023978 | A1* | 1/2003 | Bajgrowicz | H04H 40/90 725/63 |
| 2003/0093804 | A1* | 5/2003 | Chang | H04N 7/17309 725/39 |
| 2003/0141949 | A1* | 7/2003 | Couet | H04N 7/20 455/76 |
| 2003/0159157 | A1* | 8/2003 | Chan | H04N 21/4532 725/38 |
| 2003/0179723 | A1* | 9/2003 | Novak | H04N 7/20 370/480 |
| 2004/0209584 | A1* | 10/2004 | Bargroff | H03D 7/1425 455/180.1 |
| 2004/0255326 | A1* | 12/2004 | Hicks, III | H04H 60/27 725/112 |
| 2005/0071882 | A1* | 3/2005 | Rodriguez | H04N 21/2393 348/E7.071 |
| 2005/0144646 | A1* | 6/2005 | Lecrom | H04N 5/445 386/E5.001 |
| 2005/0185723 | A1* | 8/2005 | Anvari | H04L 27/2614 375/260 |
| 2005/0190777 | A1* | 9/2005 | Hess | H04H 20/28 725/68 |
| 2005/0198672 | A1 | 9/2005 | Ikeda | |
| 2006/0225098 | A1 | 10/2006 | James et al. | |
| 2007/0136765 | A1* | 6/2007 | Shah | H04N 7/20 725/71 |
| 2007/0186249 | A1* | 8/2007 | Plourde | H04N 21/4424 725/39 |
| 2007/0263754 | A1* | 11/2007 | Currivan | H04B 1/0003 375/349 |
| 2007/0294731 | A1 | 12/2007 | Arsenault et al. | |
| 2008/0024660 | A1 | 1/2008 | Wang | |
| 2008/0031388 | A1* | 2/2008 | Rabbath | H04B 1/28 375/346 |
| 2008/0059646 | A1 | 3/2008 | Ludvig et al. | |
| 2008/0132193 | A1* | 6/2008 | Petrovic | H04H 40/90 455/12.1 |
| 2008/0174384 | A1* | 7/2008 | Petrovic | H04H 40/90 333/101 |
| 2008/0216138 | A1* | 9/2008 | Minnick | H04N 21/6143 725/110 |
| 2009/0022217 | A1* | 1/2009 | Kimata | H04B 7/0854 375/232 |
| 2009/0102706 | A1* | 4/2009 | Goldblatt | H04B 7/18517 342/352 |
| 2009/0278992 | A1* | 11/2009 | Gutknecht | H04N 21/4383 348/706 |
| 2010/0158096 | A1* | 6/2010 | Yang | H04L 25/03057 375/232 |
| 2011/0105068 | A1* | 5/2011 | Reddy | H04N 21/454 455/207 |
| 2011/0158149 | A1* | 6/2011 | Mugulavalli | H04H 20/63 725/74 |
| 2011/0252451 | A1 | 10/2011 | Turgeman et al. | |
| 2012/0002580 | A1 | 1/2012 | Nakashima et al. | |
| 2013/0003817 | A1 | 1/2013 | Ling et al. | |
| 2013/0135535 | A1* | 5/2013 | Ling | H04N 5/50 348/731 |
| 2013/0203338 | A1* | 8/2013 | Ling | H04L 61/5007 455/3.02 |
| 2013/0205349 | A1* | 8/2013 | Chang | H04N 21/64753 725/70 |
| 2016/0072534 | A1* | 3/2016 | Bargroff | H03D 7/1458 455/266 |
| 2022/0173822 | A1* | 6/2022 | Chang | H04N 21/637 |

\* cited by examiner

SYSTEM AND METHOD FOR HANDLING STACKED CHANNELS

CLAIM OF PRIORITY

This patent application is a continuation of U.S. patent application Ser. No. 17/402,789, filed Aug. 16, 2021, which is a continuation of U.S. patent application Ser. No. 16/259,021, filed Jan. 28, 2019 (U.S. Pat. No. 11,121,789), which is a continuation of U.S. patent application Ser. No. 14/316,194, filed on Jun. 26, 2014 (U.S. Pat. No. 10,193,645), which is continuation of U.S. patent application Ser. No. 13/762,939, filed on Feb. 8, 2013 (U.S. Pat. No. 8,799,964), which makes reference to, claims priority to and claims benefit from the U.S. Provisional Patent Application Ser. No. 61/596,291, filed on Feb. 8, 2012, and U.S. Provisional Patent Application Ser. No. 61/620,746, filed on Apr. 5, 2012. The aforementioned documents are all hereby incorporated herein by reference in their entirety.

TECHNICAL FIELD

Aspects of the present application relate to communications. More specifically, certain implementations of the present disclosure relate to integrated stacking for handling channel stacking or band stacking.

BACKGROUND

Existing methods and systems for receiving various wireless signals can be cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for integrated stacking for handling channel stacking or band stacking, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
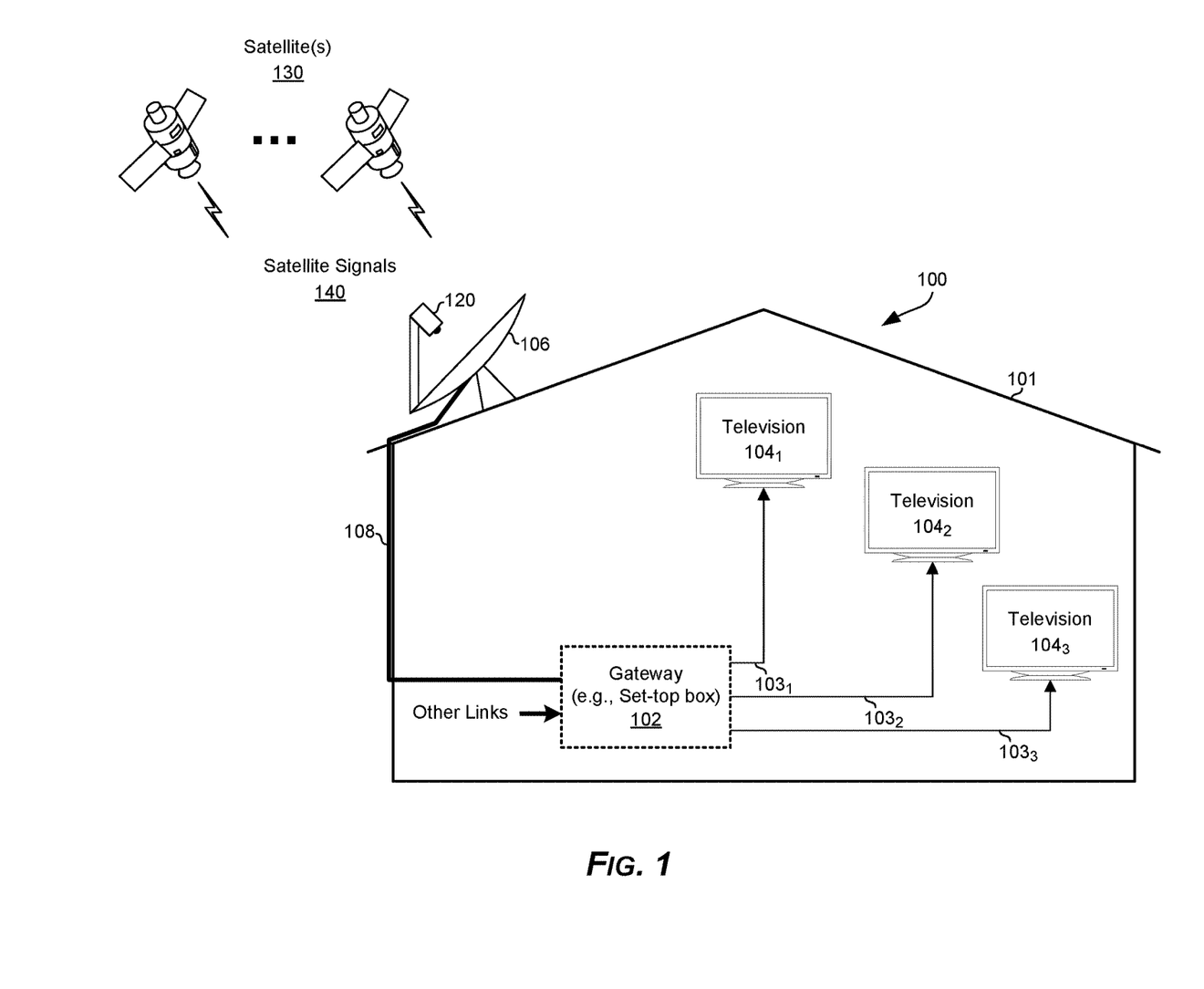
FIG. 1 illustrates an example network comprising satellite television components.

FIG. 1 illustrates an example network comprising satellite television components. Referring to FIG. 1, there is shown an in-premises network 100, a satellite reception assembly 106, a plurality of satellites 130, and a network link 108 for connecting the satellite reception assembly 106 and the in-premises network 100.

The in-premises network 100 may be setup and/or configured to service particular premises 101 (e.g., residential or commercial). In this regard, the in-premises network 100 may facilitate providing broadband and/or television (or other similar content broadcast) access in the premises 101. The in-premises network 100 may comprise, for example, a gateway 102 and a plurality of client devices, of which televisions $104_1$-$104_3$ are shown.

The plurality of satellites 130 may be utilized to transmit (beam down) satellite signals 140. In this regard, the satellite signals 140 may be utilized to broadcast satellite television content. The satellite signals 140 may comprise, for example, K, Ka, and/or Ku band Direct Broadcast Satellite (DBS) signals. The disclosure, however, is not limited to any particular type of satellite signals.

The satellite reception assembly 106 may be a satellite "dish". In this regard, the satellite reception assembly 106 may comprise circuitry operable to receive satellite signals (e.g., the satellite signals 140), and to process the received satellite signals, such as to recover data carried in the satellite signals (e.g., television channels, media content, etc.), and configure a suitable output corresponding to the recovered data for transmission to other devices that may handle use and/or distribution of the data (e.g., to the gateway 102 via the communication link 108). The satellite reception assembly 106 may comprise a housing 120. In this regard, the housing 120 may be, for example, part of the satellite reception assembly 106 (e.g., it may be mounted on a boom at or near the focal point of a parabolic reflector), and may comprise circuitry for capturing and handling satellite signals.

The communication link 108 may comprise one or more wired, wireless, and/or optical links. The communication link 108 may comprise, for example, a wired (e.g., coaxial and/or twisted-pair) and/or wireless communication medium which carries physical layer symbols in accordance with, for example, Multimedia over Coax Alliance (MoCA), Ethernet, and/or DBS standards. In some instances, the gateway 102 may be configured to terminate other communication links (not shown), which may comprise, for example, a coaxial or twisted-pair cable and/or an optical fiber which carries physical layer symbols in accordance with, for example, DSL, DOCSIS, or Ethernet standards (e.g., to facilitate cable television, terrestrial television, and/or Internet accessibility).

The gateway 102 may comprise circuitry operable to receive the signals communicated over a plurality of links (e.g., the link 108), process the signals as necessary for outputting information contained therein via a plurality of internal links 103 within the in-promises network 100. In the regard, the plurality of internal links 103 may comprise wired, wireless, and/or optical links that may be suited for use in an environment such as the in-promises network 100. For example, the internal links 103 may comprise wired connections (e.g., HDMI connections, Display Port links, MoCA links, or Ethernet connection), and/or wireless connections (e.g., Wi-Fi, ZigBee, wireless USB, or the like). The gateway 102 may also comprise circuitry operable to transmit signals via the link 108 and/or any other external links (i.e., links connecting the gateway 102 to external entities, such as broadcast or service head-ends). Accordingly, the term "gateway" in this disclosure refers to a client device which may perform satellite set-top box functions, cable television receiver functions, terrestrial television receiver functions, WAN/LAN modem functions, etc. In this regard, "satellite set-top box" functions may comprise functions necessary for delivering data from the satellite reception assembly 106 to devices within the premises.

The gateway 102 may be configured to service a plurality of client devices, which may comprise devices that may communicate with the gateway 102 via one or more point-to-point media links (e.g., HDMI, Display Port, analog video links, analog video links, or the like). An example of such client devices is televisions (e.g., televisions $104_1$-$104_3$) and similar devices that may be used in displaying or playing back multimedia content that may be broadcasted (e.g., via terrestrial signals, satellite signal, cable signal, and/or over the Internet).

In operation, the in-promises network 100 may be setup and/or used to provide various services (e.g., broadband and/or television access) within the promises 101. For example, the in-premises network 100 may comprise an Internet Protocol (IP) based network that interconnects various devices, the gateway 102 and the client devices, within a physical space (e.g., the premises 101) to each other and/or to access networks for various IP-based services such as IP-based TV (IPTV) services. In this regard, IPTV service may be applications in multicast networks that may provide delivery of broadcast TV and other media-rich services over secure, end-to-end operator managed broadband IP data networks. The IPTV services leverage the benefits provided by IP multicast to provide scalability for the increasing number of viewers and TV channels. In IPTV services, each channel may be carried by one multicast group. Thus, when a user wants to obtain particular content (e.g., watch a program on a certain channel), the user may need to be added to a multicast group corresponding to the certain channel. When the user changes channels for a new channel, the user may be added to a new multicast group corresponding to the new channel and deleted from the previous multicast group to which they were added. A two-way interactive capability in the IPTV services may enable the user to control what content to watch and when to watch such content. The user may join a multicast group and may leave the multicast group dynamically. The IPTV service enables more content variety with a plurality of channels. This makes it possible to provide a very diverse range of content so as to serve the demands and interests of mass markets, specialized groups and/or demographic communities.

The gateway 102 may be utilized to service the in-premises network 100, such as by providing broadband and/or television (or other media content) access to a plurality of client devices (e.g., the televisions $104_1$-$104_3$) within the in-premises network 100. In this regard, the gateway 102 may receive signals carrying content that may be forwarded to the client devices for use thereby. For example, the content used (e.g., displayed/played) by the televisions $104_1$-$104_3$ may be based on satellite television broadcasts. In this regard, the satellite reception assembly 106 may be configured to receive the satellite signals 140, and to process the signals such that the signal (or corresponding signals) may be fed into the gateway 102 (via the link 108) for use within the in-premises network 100 (e.g., being forwarded to the televisions $104_1$-$104_3$ via corresponding local links $103_1$-$103_3$). In some instances—e.g., when the televisions $104_1$-$104_3$ may correspond to a plurality of televisions used in different locations (e.g., rooms) in a single dwelling or different units (e.g., apartments) in multi-unit building—it may be desirable to use the televisions $104_1$-$104_3$ for concurrently viewing different contents. Therefore, it may be desirable to optimize operations of the satellite reception assembly 106 and the gateway 102 (and connectivity therebetween) to allow increasing serviceability at the lowest cost possible. In this regard, satellite (e.g., DBS) operators continuously strive to improve their Average Revenue Per User (ARPU) by making content available in additional viewing locations in the home.

Accordingly, the satellite reception assembly 106 may be configured to concurrently receive a plurality of satellite signal beams (i.e., belonging to different broadcasts). In this regard, the plurality of satellite signal beams may comprise signals transmitted by different satellites and/or signals transmitted by the same satellite with different polarization. Similarly, the gateway 102 may be configured to concurrently handle multiple feeds, which may correspond to different users. While this may be achieved by using multiple links (similar to link 108), such approach may not be desirable or (at times) feasible. Instead, in various example implementations, accommodating concurrent servicing (viewing) based on different satellite feeds may be achieved by use of channel stacking and band stacking technologies that may be utilized to increase the number of viewing places in the home, while simultaneously minimizing installation and service costs. For example, channel stacking may be implemented by taking multiple channels from different frequency bands and stacking or combining them together for transmission over the same physical medium (e.g., the link 108). Similarly, band stacking may be implemented by taking a plurality of frequency bands (or sub-bands) and stacking or combining them together for transmission.

Accordingly, use of channel stacking and/or band stacking may allow servicing multiple users via single receiver with minimal change in existing connectivity or installation. For example, in an example implementation, the satellite reception assembly 106 (and gateway 102) may be configured to support and/or utilize integrated stacking for handling channel stacking and/or band stacking, such as to allow servicing multiple users using only single link (the link 108) between the two components. Schemes for channel and/or band stacking, and architectures for and uses of integrated stacking based thereon, are described in more details in the following figures. It is also understood, that while the implementation described therein are with respect to satellite feeds, the disclosure need not be so limited. Accordingly, it may be possible use similar schemes, architectures, and/or uses with other feeds in substantially similar manner.

Figure 2:
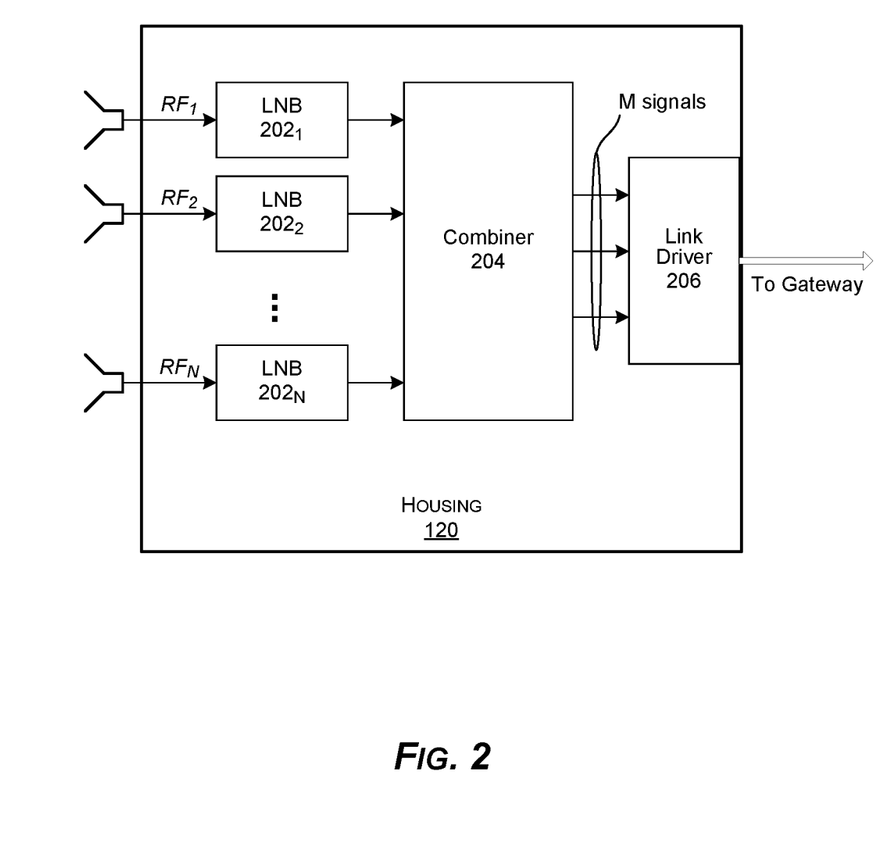
FIG. 2 illustrates an example housing component of a satellite television receiver assembly that may support integrated stacking.

FIG. 2 illustrates an example housing component of a satellite television receiver assembly that may support integrated stacking. Referring to FIG. 2, there is shown the housing 120 of the satellite reception assembly 106 of FIG. 1.

The housing 120 may be configured to support integrated stacking, for enabling channel and/or band stacking, to facilitate servicing multiple users based on multiple feeds. In this regard, the housing 102 may comprise a plurality of low noise block downconverters (LNBs) $202_1$-$202_N$, a combiner 204, and a link driver 206.

Each of the LNBs $202_1$-$202_N$ may comprise circuitry operable to receive and handle RF satellite signals, which may be captured via a reflector of a satellite reception assembly. In this regard, each LNB $202_i$ may be configured to perform such functions as low-noise amplification, filtering, and downconverting on a particular received RF (satellite) signals, to enable generating corresponding IF signals. In this regard, the IF signals may be in the L-band, half-L-band (950-1450 MHz), extended-L-band (250-2150 MHz, 300-2350 MHz), and the like. The disclosure, however, is not so limited, and the IF signals may span any suitable frequency range. Having N LNBs in the housing 120, as illustrated in FIG. 2, may allow receiving N (an integer number) satellite (RF) signals, labeled $RF_1$ to $RF_N$. In this regard, each $RF_1$ signal may correspond to a unique/distinct satellite signal, with the signals differing, for example, based on the source or the polarization (e.g., $RF_1$ may correspond to a first polarization of a first satellite, $RF_2$ may correspond to second polarization of the first satellite, $RF_3$ may correspond to a first polarization of a second satellite, and so on).

The combiner 204 may be configured to process and combine input signals corresponding to the received RF signals ($RF_1$ to $RF_N$)—i.e., outputs of the LNBs $202_1$-$202_N$. For example, the combiner 204 may be operable to amplify, downconvert, filter, and/or digitize at least a portion of the input signals. The combiner 204 may be configured to support full-spectrum—i.e., to capture an entire spectrum of each of one or more protocols of interest may be concurrently digitized, or to only digitize a portion of the input signals, such as depending on which channels (or sub-bands) in the signals are selected by client devices (e.g., which television channels are being consumed by the client devices). Once the processing of the input signals (or portions thereof) is complete, the combiner 204 may be operable to recover information carried in the signals (e.g., one or more channels contained therein), and may generate output signals carrying the recovered information. The output signals may be sent to the link driver 208, for transmission thereby (e.g., to the gateway). In some instances, the output signals may be processed in the combiner before being forwarded to the link driver 208. For example, the combiner 204 may be operable to convert to analog, upconvert, filter, and/or amplify the output signals.

The link driver 206 may be operable to process signals generated via the combiner 204 (e.g., comprising recovered information) and generate signals that may be transmitted onto a link to a corresponding link-peer device, such as a gateway/STB (e.g., link 108 to gateway 102 of FIG. 1) in a format supported by the link-peer device. For example, the link driver 206 may be operable to packetize and transmit data received via signals $RF_1$-$RF_N$, in accordance with one or more networking standards (e.g., Ethernet, Multimedia over Coax Alliance (MoCA), DOCSIS, and the like) to a link-peer device that receives satellite data using such standards. Additionally, or alternatively, the link driver 206 may be operable to perform operations (e.g., digital to analog conversion, modulation, frequency conversion, etc.) for outputting the data according to one or more multimedia standards (e.g., ATSC, DVB-S, ISDB-S, and the like) to enable receiving satellite data by devices using such standards. The output of the link driver 206 may comprise a plurality of IF signals, in a particular range to which the link-peer device (gateway/STB) may tune. For example, each of the IF signals may be in the L-band (950 MHz to 2150 MHz).

In various example implementations, the housing 120 may be configured to handle and/or support channel stacking and/or band stacking. For example, the LNBs $202_1$-$202_N$, a combiner 204, and/or a link driver 206 may be implemented using integrated stacking based architectures. In this regard, integrated stacking based architectures may comprise, for example, analog stacking architectures or digital stacking architectures. For example, in an example implementation, an analog stacking circuit may be used, and may comprise integrated filters for example. The filters may be configured to filter through particular portions (e.g., corresponding to particular channels or sub-bands). The analog stacking circuit may provide analog capture utilizing an analog multiple input and multiple output crossbar (Xbar). In this regard, the Xbar may be configured such that one or more inputs (comprising particular channels or sub-bands) may be combined and mapped to one or more outputs. In another example implementation, a digital stacking circuit may be used, to provide digital capture using full band stacking. The digital stacking circuit may be operable to provide digital capture utilizing a digital multiple input and multiple output digital crossbar. Furthermore, to allow for the digitization, the digital stacking circuit may be configured to provide analog-to-digital conversion (and, if needed, digital-to-analog conversion, such as when the system output need be analog). Example implementations for the analog stacking circuit and the digital stacking circuit are provided in FIGS. 4 and 5.

Figure 3:
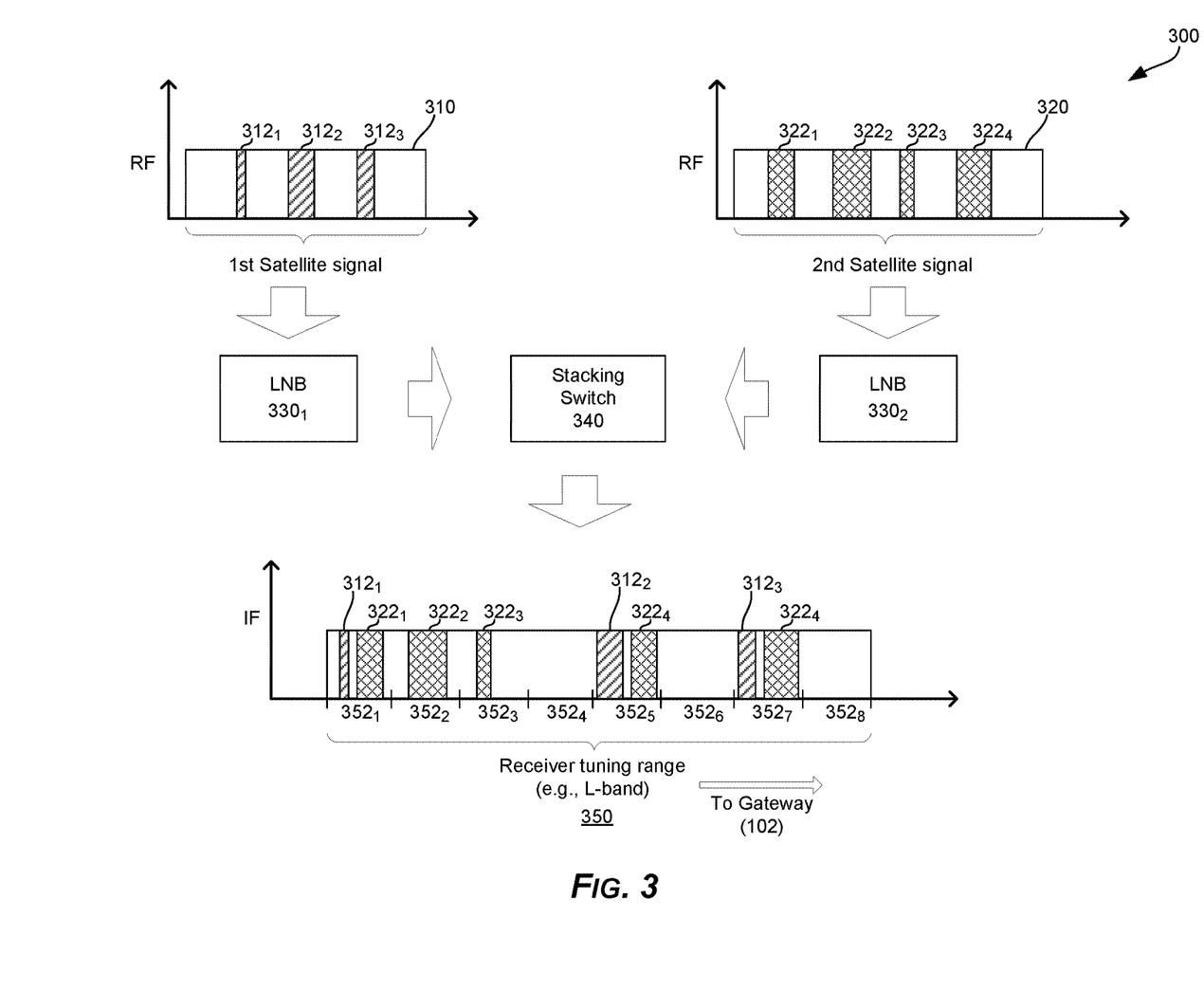
FIG. 3 illustrates example stacking scheme implemented by a system configured to support integrated stacking.

FIG. 3 illustrates example stacking scheme implemented by a system configured to support integrated stacking. Referring to FIG. 3, there is shown a scheme 300 for stacking channels or bands from different satellite beams. In this regard, use of the scheme 300 may allow combining content from multiple satellite signals onto a single physical channel for conveyance to a gateway/set-top box (STB), such as the gateway 102 of FIG. 1 for example.

In the example implementation shown in FIG. 3, channels (or bands) from two satellite signals 310 and 320 may be stacked onto a single intermediate frequency (IF) signal. In this regard, initially each of the received satellite signals 310 and 320 may be processed via corresponding low noise block downconverters (LNBs) $330_1$ and $330_2$. Each of the LNBs $330_1$ and $330_2$ may correspond to one of the LNBs $202_1$-$202_N$ of FIG. 2. The outputs of the LNBs $330_1$ and $330_2$ may then be input to a stacking switch 340. In this regard, the stacking switch 340 may be configured to combine the contents of the satellite signals 310 and 320, such as by stacking channels or bands within these signals onto a single signal. The stacking switch 340 may correspond to, for example, the combiner 204 (and, in some instances, at least a portion of the link driver 206) of FIG. 2. For example, stacking switch 340 may frequency division multiplex at least a portion of the received satellite signals beams 310 and 320 onto a common frequency band 350 which is conveyed to a gateway/STB (e.g., the gateway 102 of the in-promises network 100) via one or more physical channels (e.g., one or more coaxial cables). In this regard, the common frequency band 350 may correspond to (or be part of) the tuning range of the gateway/STB—e.g., the common frequency band may encompass the L-band.

In the example shown in FIG. 3, the stacking switch 340 may be operable to stack portions $312_1$-$312_3$ of the 1st satellite signal 310 and portions $322_1$-$322_4$ of the 2nd satellite signal 320. In this regard, portions $312_1$-$312_3$ and $322_1$-$322_4$ may correspond to individual channels or bands (sub-bands) in the satellite signals 310 and 320. Accordingly, since the gateway/STB is operable to tune to the band 350, the gateway/STB may be enabled to concurrently receive satellite content carried in the portions $312_1$-$312_3$ of the 1st satellite signal 310 and in portions $322_1$-$322_4$ of the 2nd satellite signal 320. The satellite signals 310 and 320 may comprise, for example, signals from satellite transponders transmitting content (e.g., television channels) that have been selected for consumption by the gateway/STB. The selected portions $312_1$-$312_3$ and $322_1$-$322_4$ may comprise, for example, most popular television channels, television channels that have been selected for consumption by the gateway/STB and/or signals which have sufficient SNR for reliable reception.

Figure 4:
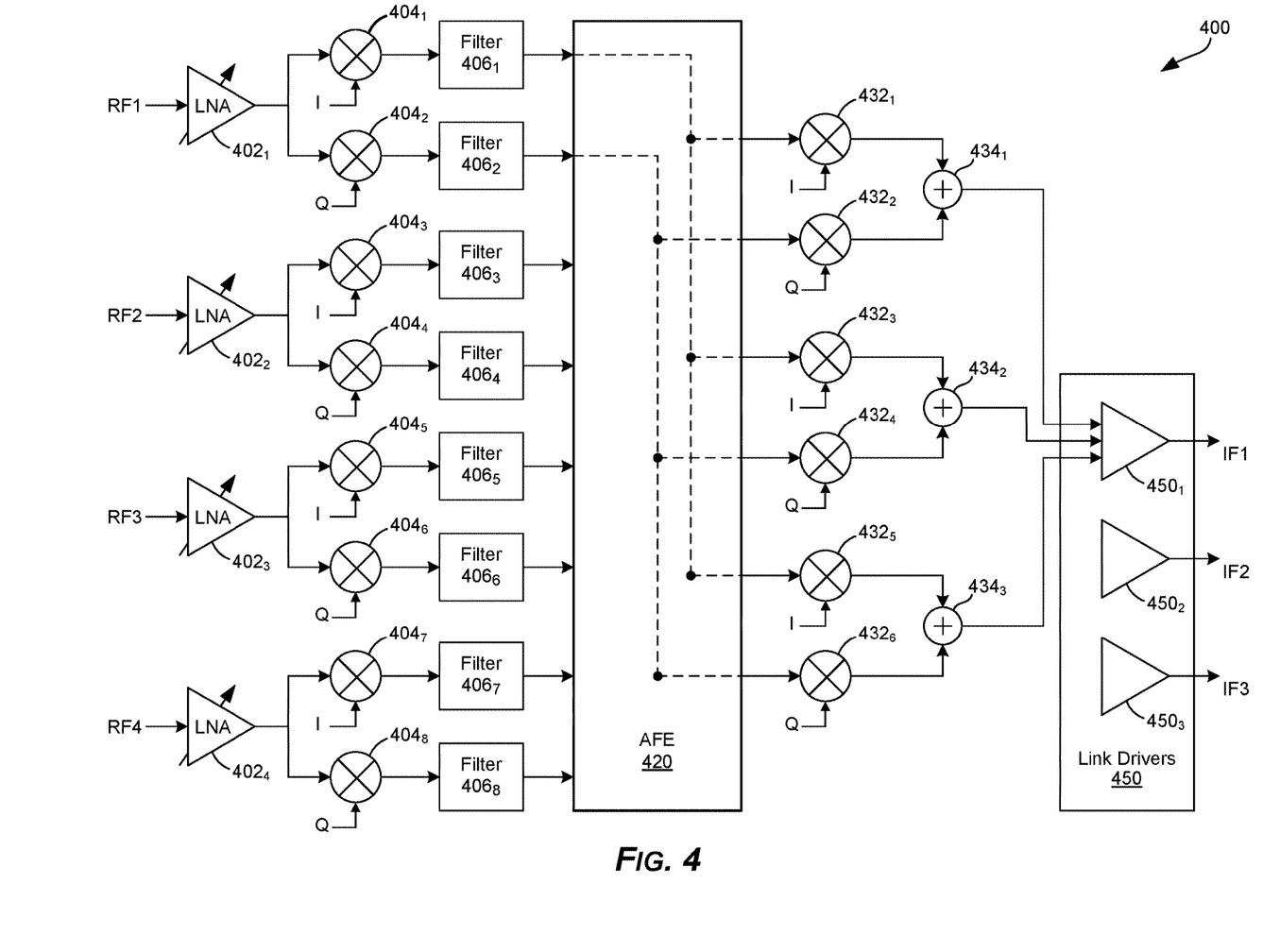
FIG. 4 illustrates an example analog band stacking architecture for use in a system that supports integrated stacking.
Figure 5A:
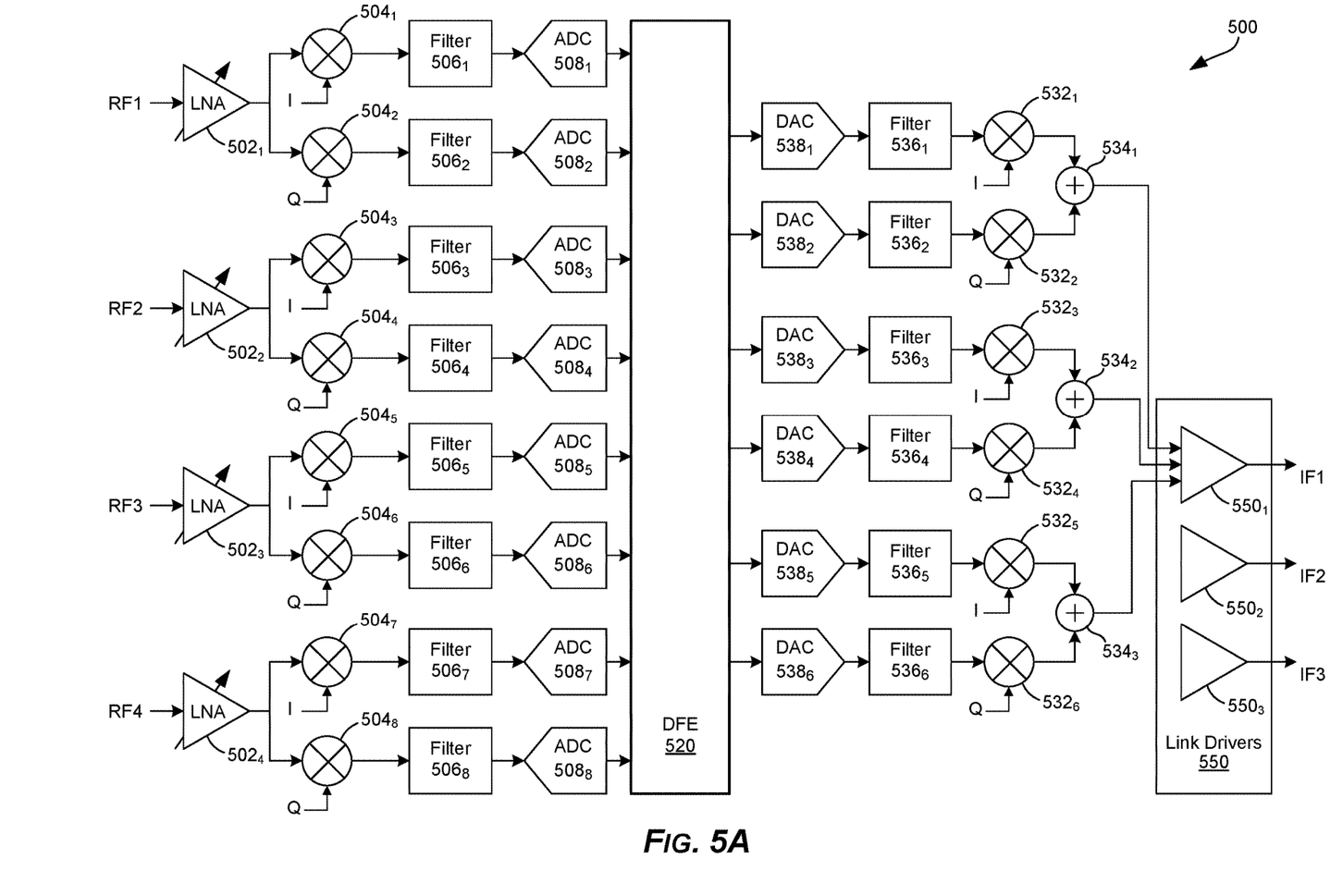
FIG. 5A illustrates an example digital band stacking architecture for use in a system that supports integrated stacking.

FIG. 4 illustrates an example analog band stacking architecture for use in a system that supports integrated stacking. Referring to FIG. 4, there is shown a system 400, which may correspond to an analog band stack architecture that may support integrated stacking. In this regard, the system 400 may be utilized to provide integrated stacking when there may be no need for digitization.

The system 400 may comprise suitable circuitry, logic, code, and/or interfaces for performing and/or supporting analog based integrated stacking, to provide channel stacking and/or band stacking, such as during reception and/or processing of a plurality of input RF signals. The input RF signals may correspond to different satellite signals (i.e., originating from different sources and/or having different polarizations). The system 400 may be integrated into and/or may correspond to at least a portion of the housing 120 (particularly, processing circuitry thereof). In this regard, system 400 may correspond to, for example, the LNBs $202_1$-$202_N$, a combiner 204, and a link driver 206 of FIG. 2. The system 400 may also correspond to only combiner 204 and a link driver 206, and the LNBs $202_1$-$202_N$ may be implemented with discrete components. As shown in FIG. 4, the system 400 may be configured to support reception of 4 different RF signals, RF1-RF4. In this regard, the system 400 may comprise, for example, a plurality of low-noise amplifiers (LNAs) $402_1$-$402_4$, a plurality of input mixers $404_1$-$404_8$, a plurality of input filters $406_1$-$406_8$, an analog front end (AFE) 420, a plurality of output mixers $432_1$-$432_6$, a plurality of adders $434_1$-$434_3$, and a link driver 450, which may comprise a plurality of drivers $450_1$-$450_3$ (which may comprise, for example, power amplifiers).

The AFE 420 may be operable to perform various signal processing functions, such as I/Q calibration, equalization, channelization, or the like. In an example implementation, the AFE 420 may also be configured to function as multiple input/multiple output switching crossbar (Xbar), whereby one or more inputs may be processed, combined and/or mapped to one or more outputs. Each LNA $402_i$ may be operable to amplifying weak signals, particular signal captured over a wireless interface (e.g., satellite signals). Each input mixer $404_i$ may be operable to multiply a plurality of signals. For example, a pair of mixers may be used to apply in-phase and quadrature signals (i.e., signals that would allow extraction of in-phase and quadrature components) to each amplified input signal ($RF_i$), such as to allow IQ calibration. The output mixers $432_1$-$432_6$ may be substantially similar to input mixers $404_1$-$404_8$, and may be used, in similar manner, to apply in-phase and quadrature signals to the outputs of the AFE 420 (to generate the in-phase and quadrature components). Each adder $434_i$ may be operable to combine (add or subtract) a plurality of signals. For example, each of the adders $434_1$-$434_3$ may be used to combine (add or subtract) the in-phase and quadrature components corresponding to an output of the AFE 420. The input filters $406_1$-$406_8$ may be operable to filter signals (e.g., outputs of the mixers $404_1$-$404_8$), based on one or more criteria. For example, the input filters $406_1$-$406_8$ may be configured as low-pass filters (LPFs)—that is to pass low-frequency signals (below particular threshold, or a "cutoff frequency") and to attenuate signals with frequencies higher than the cutoff frequency.

In operation, the AFE 420 may be used to provide crossbar (Xbar) switching between multiple inputs and multiple outputs, such as in accordance with integrating stacking (for channels and/or band stacking). In this regard, the AFE 420 may have X (an integer number) inputs and Y (an integer number) outputs, and may provide channel and/or band stacking by combining one or more inputs, which may have been processed to comprise particular channels or bands, into one or more outputs. The number of inputs, X, may depend on the number of system inputs (i.e., the number of input RF signals). For example, when configured to extract I/Q components, the number of inputs, X, may represent double the number of different feeds or RF signals supported—e.g., when there are 4 different RF inputs, X is 8), corresponding to outputs of the input filters (e.g., input filters $406_1$-$406_8$). The number of outputs, Y, may depend on the system output and/or particular characteristics thereof (e.g., total number of distinct frequencies or frequency bands that may be in the system output). For example, the number of outputs, Y, may be set to double the number of bands in the output (as a whole, or a particular IF signal therein). Thus, as shown in FIG. 4, Y may be 6. Thus, the AFE 420 may be configured to provide particular mapping between the X inputs and the Y outputs, in accordance with an applicable scheme (e.g., an integrated stacking scheme). The AFE 420 may also apply additional signal processing functions (e.g., I/Q calibration, equalization, channelization, etc.). These functions, along with the additional adjustments or signal processing functions (e.g., filtering, amplifications, downconversions, upconversions, etc.), which may be applied to the inputs and/or outputs of the AFE 420, may be configured in an adaptive manner. In this regard, the components and/or functions of the AFE 420 (and/or components used in the overall path that includes the AFE 420) may be configured to provide the desired channel and/or band stacking, and/or to generate outputs at different frequencies such that they can be combined onto one or more physical channels (e.g., a coaxial cable), corresponding to the plurality of link drivers $450_1$-$450_3$ for example, to enable conveyance to the gateway/STB for example.

The architecture implemented in system 400 may enable implementing analog band stacking without full-band capture. In this regard, band stacking may not necessarily need sharp digital channel selection, and as such the stacking may be performed without the need for analog-to-digital conversions (and thus, the need for subsequent digital-to-analog conversions). In other words, the system 400 may be configured for low power transmission, being implemented without power-consuming analog-to-digital convertors (ADCs) and/or digital-to-analog convertors (DACs). The system 400 may be implemented, for example, utilizing a Weaver down-up image-reject architecture. For example, the output mixers $432_1$-$432_6$ may be configured to provide harmonic rejection upconversion, such to avoid aliasing. The selection of inputs may be accomplished by the crossbar switch (Xbar) of the AFE 420. The selection of a lower/upper sideband may be accomplished by upconversion mixer(s). In some instances, the system 400 may be configured not to perform digital I/Q calibration. For example, the system 400 may be configured to operate at about 50 dB (e.g., comprising SNR required 11 dB, noise 11 dB, 28 dB D/U). The I/Q accuracy may be enhanced by utilizing double-quadrature. In an example embodiment of the invention, the sum and difference between the upconverted frequency and the intermediate frequency (IF), for example of 350 MHz (right after downconversion), may be present at the IF output. In this regard, the system 400 may be configured not to filter out an unwanted band since it may be only 200 MHz, for example, away from the wanted band. The unwanted band may be reduced or removed by sharpening the input filters $406_1$-$406_8$, after downconvert, and/or by adding, for example, 4 more front-ends and placing an LO at the center of the desired band.

FIG. 5A illustrates an example digital band and/or channel stacking architecture for use in a system that supports integrated stacking. Referring to FIG. 5A, there is shown a system 500, which may correspond to a digital band stack architecture that may support integrated stacking.

The system 500 may comprise suitable circuitry, logic, code, and/or interfaces for performing and/or supporting digital based integrated stacking, to provide channel stacking and/or band stacking, such as during reception and/or processing of a plurality of input RF signals. The input RF signals may correspond to different satellite signals (i.e., originating from different sources and/or having different polarizations). The system 500 may be integrated into and/or may correspond to at least a portion of the housing 120 (particularly, processing circuitry thereof). In this regard, system 500 may correspond to, for example, the LNBs $202_1$-$202_N$, a combiner 204, and a link driver 206 of FIG. 2. The system 500 may also correspond to only combiner 204 and a link driver 206, and the LNBs $202_1$-$202_N$ may be implemented with discrete components. As shown in FIG. 5A, the system 500 may be configured to support reception of 4 different RF signals, RF1-RF4. In this regard, the system 500 may comprise, for example, a plurality of low-noise amplifiers (LNAs) $502_1$-$502_4$, a plurality of input mixers $504_1$-$504_8$, a plurality of input filters $506_1$-$506_8$, a plurality of analog-to-digital convertors (ADCs) $508_1$-$508_8$, a digital front end (DFE) 520, a plurality of digital-to-analog convertors (DACs) $538_1$-$538_6$, a plurality of output filters $536_1$-$536_6$, a plurality of output mixers $532_1$-$532_6$, a plurality of adders $534_1$-$534_3$, and a link driver 550, which may comprise a plurality of drivers $550_1$-$550_3$ (which may comprise, for example, power amplifiers).

The DFE 520 may be substantially similar to the AFE 420, and may similarly be operable to perform various signal processing functions, such as I/Q calibration, equalization, channelization, or the like. In an example implementation, the DFE 520 may also be configured to provide crossbar (Xbar) switching function crossbar, whereby one or more inputs of the DFE 520 are mapped to one or more outputs of the DFE 520. The LNAs $502_1$-$502_4$, the input mixers $504_1$-$504_8$, the input filters $506_1$-$506_8$, the output mixers $532_1$-$532_6$, and the adders $534_1$-$534_3$ may be substantially to corresponding elements/components in the system 400 of FIG. 4, and may substantially operate in similar manner. The output filters $536_1$-$536_6$ may be operable to filter input signals (e.g., outputs of the DACs $538_1$-$538_6$) based on one or more criteria. For example, the output filters $536_1$-$536_6$ may be configured as low-pass filters (LPFs). The ADCs $508_1$-$508_8$ may be operable to perform analog-to-digital conversions (e.g., on outputs of the input mixers $504_1$-$504_8$); whereas the DACs $538_1$-$538_6$ may be operable to perform digital-to-analog conversions (e.g., on outputs of the DFE 520).

In operation, the system 500 may be utilized to provide integrated stacking, substantially as described with respect to system 400 of FIG. 4, for example. However, whereas the system 400 may enable implementing analog band stacking, the system 500 may be utilized to provide digital based integrated stacking, which may comprise digital band stacking that may be implemented with or without full-band capture. For example, the DFE 520 may be used to provide crossbar (Xbar) switching, between X (an integer number) inputs and Y (an integer number) outputs, and may provide channel and/or band stacking by combining one or more inputs, which may have been processed to comprise particular channels or bands, into one or more outputs. The DFE 520 may also apply additional signal processing functions (e.g., I/Q calibration, equalization, channelization, etc.). These functions, along with the additional adjustments or signal processing functions (e.g., analog-to-digital conversions, digital-to-analog conversions, filtering, amplifications, downconversions, upconversions, etc.), which may be applied to the inputs and/or outputs of the DFE 520, may be configured in an adaptive manner. In this regard, the components and/or functions of the DFE 520 (and/or components used in the overall path that includes the DFE 520) may be configured to provide the desired channel and/or band stacking, and/or to generate outputs at different frequencies such that they can be combined onto one or more physical channels (e.g., a coaxial cable), corresponding to the plurality of link drivers $550_1$-$550_3$ for example, to enable conveyance to the gateway/STB for example.

In an example implementation, the digital band stacking implemented via the system 500 may be configured to perform signal detection in the analog domain while performing digital I/Q calibration in the digital domain. For example, I/Q accuracy in the digital band stacking may be enhanced by utilizing double-quadrature conversion in the upconversion path to eliminate I/Q calibration of the upconverter. In an example implementation, digital band stacking provided via the system 500 may support various security techniques, such as a one-time password (OTP) to secure the data. In another example implementation, digital band stacking may support channel filtering in the DFE 520, which may allow implementing channel stacking.

Figure 5B:
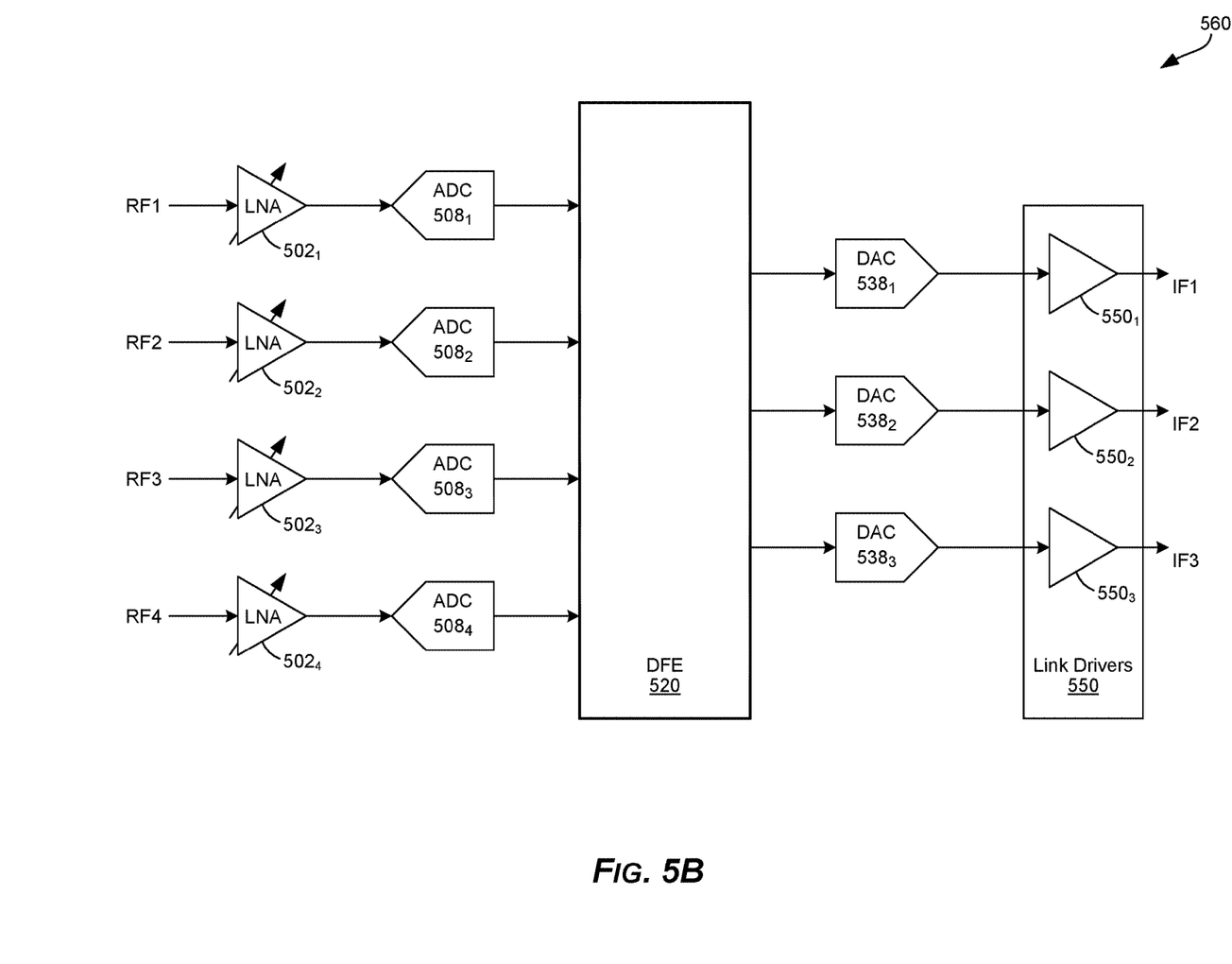
FIG. 5B illustrates an example simplified digital band stacking architecture for use in a system that supports integrated stacking using full-band capture.

FIG. 5B illustrates an example simplified digital band stacking architecture for use in a system that supports integrated stacking using full-band capture. Referring to FIG. 5B, there is shown Referring to FIG. 5A, there is shown a system 560, which may correspond to a simplified band stack architecture for use in supporting integrated stacking using full-band capture.

The system 560 may comprise suitable circuitry, logic, code, and/or interfaces for performing and/or supporting digital based integrated stacking, to provide channel stacking and/or band stacking using full-band capture, such as during reception and/or processing of a plurality of input RF signals. In this regard, the system 560 may correspond to a simplified version of the system 500, with various components of the system 500 removed due the configuration for full-band capture, with the remaining components (having the same reference numbers) being implemented and/or configured in substantially similar manner as described with respect to system 500 of FIG. 5A. Accordingly, the overall operation of the system 560 may be substantially similar to the system 500, as described with respect to FIG. 5A, with the exception on the elimination of operations of any eliminated component(s), and/or any adjustments (e.g., to remaining components) that may be needed to account for the removal of the eliminated components (and their functions) and for the use of full-band capture.

For example, since the system 560 is configured to provide integrated stacking based on full-band capturing, various components that are utilized in input paths to the DFE 520 may be eliminated (or disabled), since they may not be necessary when full-band captured is utilized. In this regard, input mixers $504_1$-$504_8$ and the input filters $406_1$-$406_8$ may be eliminated. Also, half of the input ADCs $508_1$-$508_8$ (e.g., ADCs $508_5$-$508_8$), since with 4 RF inputs (RF1-RF4), only four ADCs needed because with the elimination of the mixers and filters, there would be no IQ signals. The remaining 4 ADCs $508_1$-$508_4$ may then be configured to full-band capture the entire spectrum corresponding to the respective RF signals.

In some instances, various components that are utilized in the output paths from the DFE 520 may be eliminated (or disabled), since they may not be necessary when full-band captured is utilized. For example, the output filters $536_1$-$536_6$, the output mixers $532_1$-$532_6$, and the adders $534_1$-$534_3$ may be eliminated. Also, half of the DACs $538_1$-$538_6$, (e.g., DACs $538_4$-$538_6$) may be eliminated, since there would be no IQ signals, and only three DACs (e.g., DACs $538_1$-$538_3$) would be needed for the three IF drivers (drivers $550_1$-$550_3$). In other words, full-band capturing based integrated stacking, may allow eliminating complex mixers schemes at the output side at the expense of the DACs being able and configured to handle the entire spectrum. While the full-band capture based architecture shown in FIG. 5B comprises elimination of mixing (and related filtering and/or adding) at both of the input-side and the output-side, the disclosure is not so limited. In this regard, some implementations may incorporate less simplification, with a combination of using mixing in front of (i.e. at the input-side of) the DFE 520 (i.e., resembling the input-side of system 500 of FIG. 5A) and full-spectrum DAC at the output, or vice versa.

Figure 6:
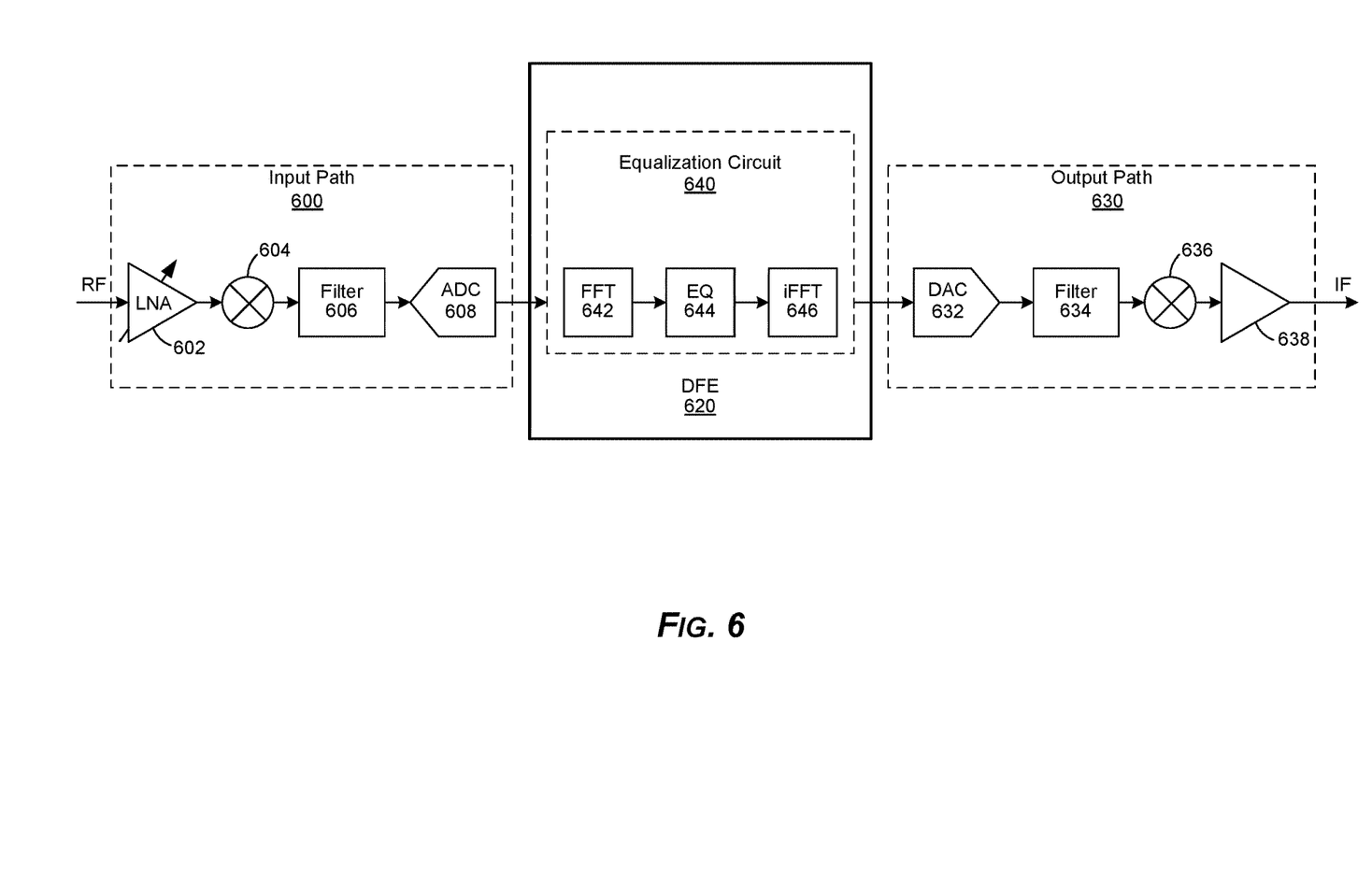
FIG. 6 illustrates example stacking with equalization for use in a system that supports integrated stacking.

FIG. 6 illustrates example stacking with equalization for use in a system that supports integrated stacking. Referring to FIG. 6, there is shown a digital front end (DFE) 620, which may comprise one or more equalization circuits 640 that may provide equalization (e.g., during baseband crossbar switching) between an input path 600 and an output path 630.

The DFE 620 may correspond to the DEF 420 or DFE 520 of FIGS. 4 and 5, respectively, for example. In this regard, as shown in FIG. 6, the DEF 620 may incorporate an equalization function, by use of equalization circuits 640, during integrated stacking (i.e., in the course of crossbar switching).

The input path 600 may comprise a low-noise amplifier (LNAs) 602, a mixer 604, an input filters 606, and an analog-to-digital convertor (ADC) 608. In this regard, the input path 600 may correspond to, for example, one of the four input branches (corresponding to RF inputs RF1-RF4) of FIG. 5A. The output path 630 may comprise a digital-to-analog convertor (DAC) 632, an output filter 634, a mixer 636, and power amplifier (PA) 638. In this regard, the output path 600 may correspond to, for example, one of the three output branches of FIG. 5A.

Each equalization circuit 640 may comprise circuitry for channel equalization. For example, the equalization circuit 604 may comprise a Fast-Fourier-Transform (FFT) block 642, an equalization block 644, and an inverse Fast-Fourier-Transform (iFFT) block 646. In this regard, the FFT block 642 may be configured to convert time-domain discrete samples of a signal into their corresponding frequency-domain components. The equalization block 644 may be configured to equalize (i.e. adjust the balance between) the frequency components outputted by the FFT block 642. The iFFT block 646 may be configured to convert the frequency-domain components of a signal (after equalization) to its corresponding time-domain equivalent.

In operation, the equalization circuits 640 may be utilized to perform equalization, such as during integrated stacking processing (to provide channel and/or band stacking). In this regard, power may be equalized during stacking operations, such as to ensure that power may remain relatively flat (e.g., over an entire dynamic range). For example, a frequency band may be divided into frequency bins, and a weighting may be given to the frequencies in each of the frequency bins. The power equalization may then be provided over the frequency bins. In an example implementation, one or more suitable techniques (e.g., overlap and add technique) may be utilized to prevent leakage of power from one frequency bin into adjacent frequency bins across the entire band. In other words, equalization of the power may be provided across all the frequency bins so the power may be relatively flat across all of the frequency bins. Before the frequency bins are shifted, they may be equalized so that the power is more evenly distributed across all the frequency bins.

Figure 7:
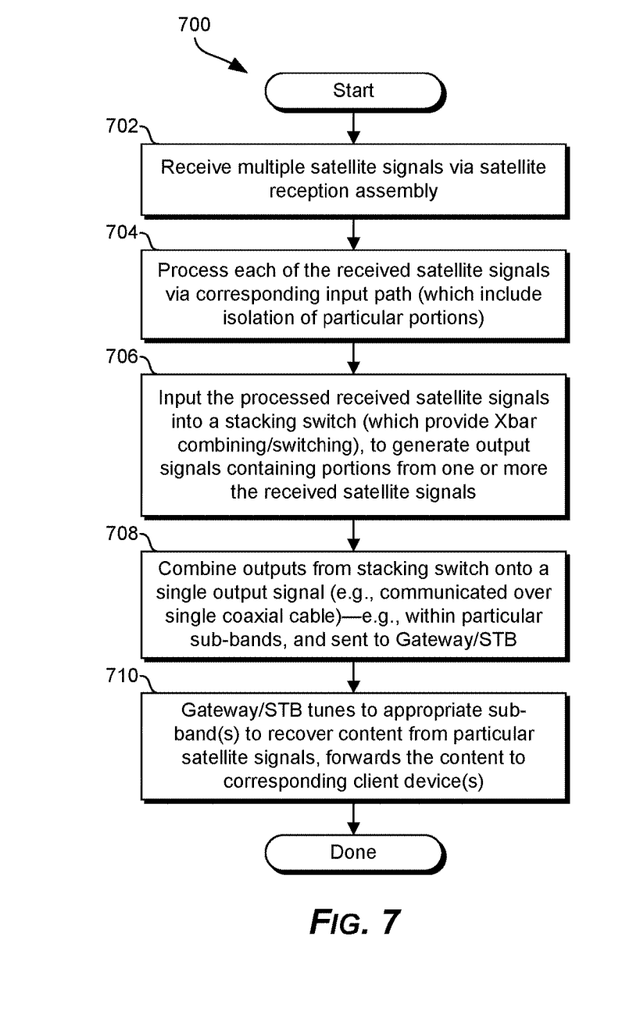
FIG. 7 is a flow chart that illustrates example handling of plurality of satellite signals using integrated stacking.

FIG. 7 is a flow chart that illustrates example handling of plurality of satellite signals using integrated stacking. Referring to FIG. 7, there is shown a flow chart 700 comprising a plurality of example steps for receiving and handling multiple satellite signals (concurrently) using integrate stacking solutions.

In step 702, a satellite reception assembly (e.g., satellite assembly 106) may receive multiple satellite signals. In step 704, each of the received satellite signals may be processed via corresponding input path. The processing in each input path may comprise applying low-noise amplification, mixing (e.g., to separate I/Q components), filtering, and/or analog-to-digital conversion. In step 706, the processed received satellite signals may be input into a stacking switch, which may provide crossbar (Xbar) combining/switching, to enable generation of output signals containing portions from one or more the received satellite signals. In step 708, outputs from a stacking switch may be combined onto a single output signal (e.g., for transmittal over a single coaxial cable)—e.g., within particular sub-bands, and may be communicated to a gateway/STB device. In step 710, the gateway/STB may tune to appropriate sub-band(s) in the signal output signal received from the satellite reception assembly, to recover content from particular satellite signals, which may be forwarded to corresponding client device(s)—i.e., allowing concurrent servicing of multiple client devices whereby content from different satellite signals can be provided to different client devices at the same time.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for integrated stacking for handling channel stacking or band stacking.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A system, comprising:
   a gateway, and
   a satellite reception assembly configured to communicate with the gateway via a single link which forms existing connectivity between the satellite reception assembly and the gateway;
   wherein the gateway is configured to deliver requested content to a client device of a plurality of client devices via a network and generate an output signal according to the requested content for the client device,
   wherein the satellite reception assembly is configured to frequency stack a plurality of satellite signals to obtain stacked content through channel stacking or band stacking and equalize the stacked content; and
   wherein the satellite reception assembly comprises:
   a plurality of input mixers, each of the plurality of input mixers being configured to process a component of a satellite signal;
   a plurality of first filters configured to respectively process a plurality of first mixer output signals of the plurality of input mixers;
   a plurality of analog-to-digital convertors (ADCs) configured to respectively process a plurality of first filter output signals of the plurality of first filters;
   a digital front end (DFE) providing crossbar combining/switching configured to map a plurality of ADC output signals of the plurality ADCs to a plurality of DFE output signals, a number of the plurality of DFE output signals being less than a number of the plurality of ADC output signals;
   a plurality of digital-to-analog convertors (DACs) configured to respectively process the plurality of DFE output signals;
   a plurality of second filters configured to respectively process a plurality of DAC output signals of the plurality of DACs;
   a plurality of output mixers configured to process a plurality of second filter output signals of the plurality of second filters; and
   a plurality of adders configured to process a plurality of second mixer output signals of the plurality of output mixers to output a number of adder output signals, a number of the adder output signals being less than a number of the plurality of second mixer output signals.

2. The system of claim 1, wherein the single link is configured according to an Ethernet standard.

3. The system of claim 1, wherein the single link is configured according to a Data Over Cable Service Interface Specification (DOCSIS) standard.

4. The system of claim 1, wherein the single link is configured to communicate Internet protocol (IP) packets.

5. The system of claim 1, wherein the single link is configured to communicate IPTV packets.

6. The system of claim 1, wherein the network comprises a Multimedia over Coaxial Alliance (MoCA) network.

7. The system of claim 1, wherein the network comprises a wireless network.

8. The system of claim 1, wherein the network comprises an Ethernet network.

9. The system of claim 1, wherein the requested content comprises at least one TV channel.

10. The system of claim 1, wherein the requested content comprises multimedia content received via an Internet connection.

11. The system of claim 1, wherein the gateway is configured to use the network to deliver the requested content while also delivering other content.

12. A method, comprising:
    receiving, by a gateway from a client device of a plurality of client devices, a request for content selected from a plurality of television (TV) channels;
    receiving, by the gateway from a satellite reception assembly, a single wire input signal comprising the plurality of TV channels via a single link; and
    delivering, by the gateway to the client device, the content requested over a network;
    wherein the single wire input signal is generated by the satellite reception assembly by stacking one or more portions from the content requested and at least one other signal to generate a stacked signal on the single link through channel stacking or band stacking, and applying power equalization to the stacked signal to prevent leakage of power from at least one frequency into adjacent frequencies across an entire frequency band corresponding to the one or more portions from the content requested and the at least one other signal, wherein the satellite reception assembly comprises:

a plurality of input mixers, each of the plurality of input mixers being configured to process a component of a satellite signal;

a plurality of first filters configured to respectively process a plurality of first mixer output signals of the plurality of input mixers;

a plurality of analog-to-digital convertors (ADCs) configured to respectively process a plurality of first filter output signals of the plurality of first filters;

a digital front end (DFE) providing crossbar combining/switching configured to map a plurality of ADC output signals of the plurality ADCs to a plurality of DFE output signals, a number of the plurality of DFE output signals being less than a number of the plurality of ADC output signals;

a plurality of digital-to-analog convertors (DACs) configured to respectively process the plurality of DFE output signals;

a plurality of second filters configured to respectively process a plurality of DAC output signals of the plurality of DACs;

a plurality of output mixers configured to process a plurality of second filter output signals of the plurality of second filters; and a plurality of adders configured to process a plurality of second mixer output signals of the plurality of output mixers to output a number of adder output signals, a number of the adder output signals being less than a number of the plurality of second mixer output signals.

13. The method of claim 12, wherein the single link is configured according to an Ethernet standard.

14. The method of claim 12, wherein the single link is configured according to a data over cable service interface specification (DOCSIS) standard.

15. The method of claim 12, wherein the single link is configured to communicate Internet protocol (IP) packets.

16. The method of claim 12, wherein the single link is configured to communicate IPTV packets.

17. The method of claim 12, wherein the network comprises a MoCA network.

18. The method of claim 12, wherein the network comprises a wireless network.

19. The method of claim 12, wherein the network comprises an Ethernet network.

20. The method of claim 12, wherein the content requested comprises at least one TV channel.

21. The method of claim 12, wherein the gateway is further configured to deliver multimedia content received via an Internet connection to the client device.

22. The method of claim 12, wherein the gateway is configured to use the network to deliver the content while also delivering other content.

* * * * *